Patented June 23, 1953

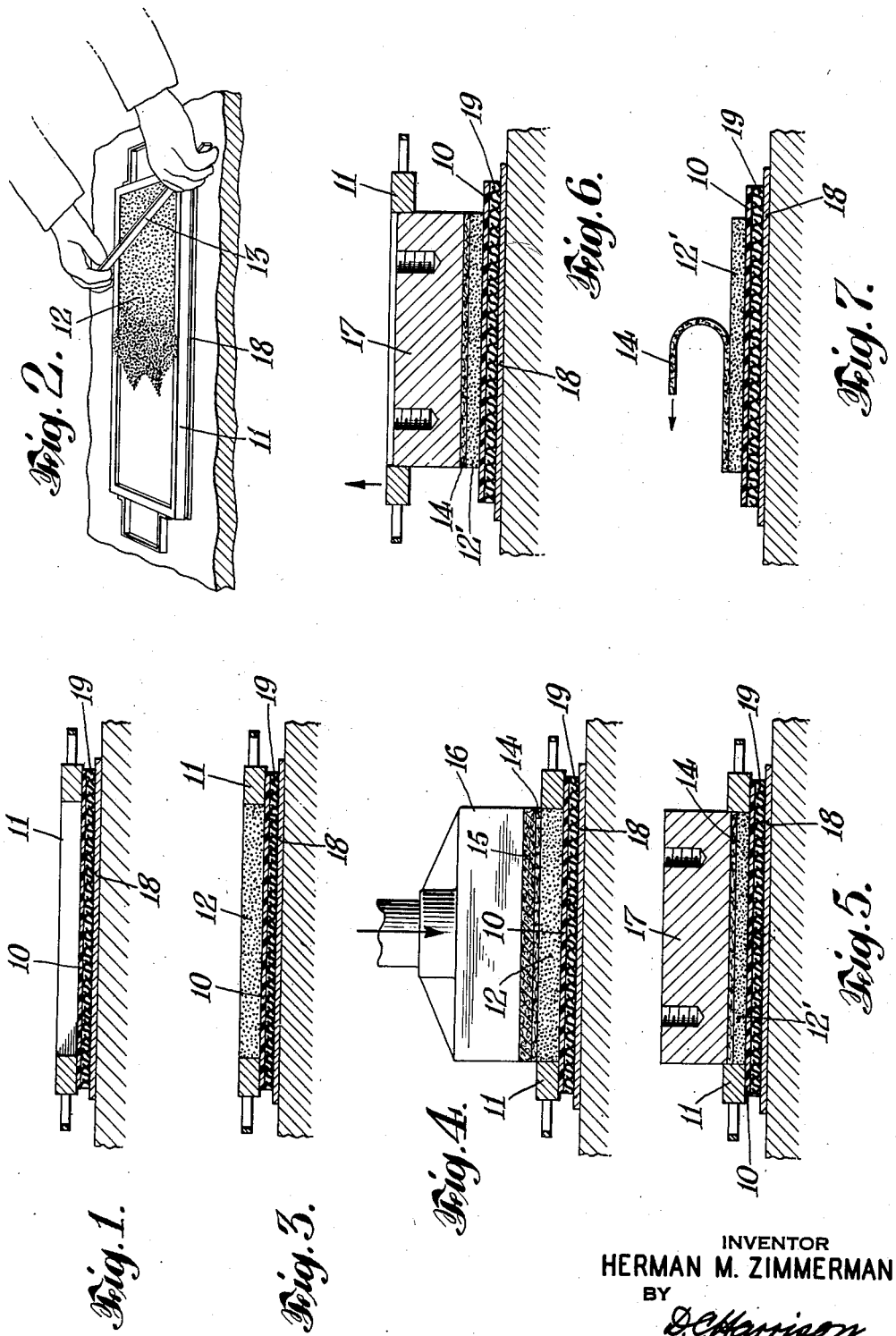

2,642,628

UNITED STATES PATENT OFFICE 2,642,628

METHOD OF FORMING A WET CATHODE PORTION

Herman Meredith Zimmerman, Cleveland, Ohio, assignor, by mesne assignments, to Union Carbide and Carbon Corporation, a corporation of New York Application December 22, 1948, Serial No. 66,785

9 Claims. (Cl. 18—54.7)

This invention relates to the manufacture of a thin and compact deferred action gas depolarized primary cell of the type disclosed in the prior application of Zimmerman and Cahoon, Serial No. 53,174, filed October 7, 1948, now U. S. Patent No. 2,572,296, for "Primary Cell and Battery and Method of Making Same," and has for an object to provide an easy method for getting water into such wet mix cathode portion. Another object is to get such water into the cathode portion without disturbing the uniform distribution of the carbon black or causing it to cake during moistening. Yet a further object is to facilitate the formation of such a wet mix cathode portion in the cell without objectionable air pockets in the thin wet cathode portion or between it and the foundation where formed.

In the production of a thin compact dry cell of the above type, improvement was sought with respect to forming the thin moist mix cake designated by the numeral 28 in the aforementioned prior application of Zimmerman et al. The carbon black desired for the wet portion of the cathode is one which has good electrical conductivity, is absorptive of electrolyte, and capable of functioning over a substantial range of dryness and wetness. A preferred type carbon black is that sold under the name of Cabot RC2. Another type is that commonly used in dry cells and in the rubber industry and known as Shawinigan acetylene black. Such blacks are fluffy when dry and tend to cake up when wet. With the black spread in a thin layer, the thinner the layer the more difficulty it is to spread the black uniformly. A layer of thinly spread dry black tends to blow or to become non-uniform by as little as a few drops of moisture falling on it.

It has been found that the production of the cell is improved particularly with respect to the formation of the wet cathode by applying to the anode assembly the proper amount of carbon black which is to be in the wet cathode, this black being dry or substantially dry as applied (at most having less water mixed with it than will cause it to ball up), and then simultaneously applying pressure and water to the black, the amount of water applied simultaneously with pressure being sufficient to wet the carbon to the desired extent and the pressure being sufficient to compress the carbon black so that in the finished condition the wet cathode is of the desired thickness, porosity and wetness. More specifically and as a general example of the production of a disc shaped wet cathode portion, a molding ring of a size to give a desired wet cathode of the desired diameter is laid on the anode assembly, the height of the ring being such that the open center portion of the ring, when filled and levelled with dry carbon black, holds sufficient black to give, when the black is wetted and compressed to the desired extent, a disc of the desired thickness. The open center portion of the ring is then filled with dry carbon black. A sheet of blotting paper or other bibulous material, wet with water, is then laid over the black and a plunger or ram of a size to fit the opening in the ring is brought against the bibulous sheet. When the plunger is forced down into the ring, the carbon black is compressed and water is simultaneously squeezed out of the blotting paper into the black. The water has a binding effect on the particles of carbon black, and upon removing the molding ring, plunger and paper, there remains a moist cathode, molded on the anode element, which is quite homogeneous and of the desired diameter, thickness, porosity and moisture content. To facilitate the wetting of the black, the water may carry a wetting agent. Where desired, aqueous electrolyte may be applied in the same manner as water, the aqueous electrolyte being water carrying a conductive electrolyte material, for instance, zinc chloride.

A more detailed description of the invention will be found in the following portions of this specification taken in conjunction with the accompanying drawings, wherein:

Fig. 1 shows a rectangular mold ring in position for receiving the carbon black particles of which the wet mix cathode portion is formed;

Fig. 2 illustrates the method of smoothing off the surface of the mix within the mold by passing a scraper strip thereover;

Fig. 3 shows the carbon mix within the mold after it has been smoothed by the process of Fig. 2;

Fig. 4 illustrates the start of the application of pressure to compress the mix and to squeeze moisture out of the wet bibulous sheet into the carbon mix;

Fig. 5 shows the substitution of a stripper plate for the plunger and bibulous material to facilitate removal of the mold ring;

Fig. 6 shows how the mold ring is removed from the mix and stripper plate;

Fig. 7 illustrates the manner of removing the kraft paper (described later) from the top of the wet mix.

This invention is an improvement upon the method of forming a wet mix cathode portion in a thin flat dry cell of the type disclosed in said previously mentioned Patent No. 2,572,296 of Zimmerman and Cahoon for "Primary Cell and Battery and Method of Making Same."

The cellophane separator sheet 10, for embodiment in the cell of the aforementioned invention of Zimmerman et al., has the mold ring 11 supported thereon, as shown in Fig. 1. Dry carbon black particles 12 are filled into the ring 11 and smoothed off by a scraper blade 13, as shown in Fig. 2, the blade preferably being long enough to rest on opposite sides of the ring. The blade 13 is preferably tilted so that its bottom surface is at a slight angle to the horizontal in order to obtain a better smoothing and preliminary compressing action on the carbon particles 12 or, if desired, the surface of the blade which cooperates with the carbon particles may be given this upward inclination.

The wet portion of the cathode contains, typically, 200 parts by weight of acetylene black and 519 parts by weight of aqueous 10% zinc chloride solution and has 15-20% of its volume as open pores. Variations in the materials, amounts thereof and porosity or percent pores may be in accordance with the description in the prior application of Heise and Schumacher, Serial No. 52,472, filed October 2, 1948, for "Primary Cell and Battery and Method of Making Same," now Patent No. 2,612,532, dated September 30, 1952, and the prior application of Cahoon and Heise, Serial No. 52,988, filed October 6, 1948, for Primary Galvanic Cell and Battery and Method of Making Same," now Patent No. 2,612,538, dated September 30, 1952. In this moist mix the moisture constitutes a binder for the carbon particles, as well as later serving as electrolyte solvent. To shorten the time required for this wetting operation and to facilitate the penetration of the moisture into the mix, the electrolyte solution of 10% zinc chloride preferably has added thereto about 1% of some stable wetting agent, such as a water solution of sodium 2-ethylhexyl sulphate,

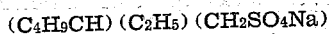
$$(C_4H_9CH)(C_2H_5)(CH_2SO_4Na)$$

or other stable wetting agent such as will occur to those skilled in the art. Alcohol or acetone in similar concentrations are also effective.

In the preferred practice, on top of the mold ring 11 and contacting the smoothed off carbon particles 12 is placed a sheet of thin, high wet-strength, water permeable paper 14, laid smoothly in place. The particular paper 14 which was used was a Munising #2-1089, about .004" in thickness, the same being an alpha-cellulose base impregnated with a melamine resin to hold the fibers together when wet. Thin kraft paper is equally suitable. This paper easily transmits water but carbon particles do not adhere to it as they do to a fuzzier and softer material, for instance, blotting paper, presenting unbound and uncoated fibers. Over the paper 14 is laid a wet bibulous material 15, such as blotting paper soaked in water or electrolyte solution, to which the wetting agent is added, if desired. The particular blotting paper used was Economy White or Wrenn's Bluebird 140 lb. blotting paper cut into sheets. Upon the application of pressure to the wet blotting paper either by a rolling platen or a plunger type of pressure applicator 16, moisture is pressed from the bibulous material 15 through the paper 14 into the mix 12, which after receiving its moisture is designated by the numeral 12'. Too much moisture in the mix is not desirable for a cell which is to deliver high current and voltage in the shortest possible time. The following table illustrates the effect of mix wetness within the preferred range on cell performance:

| Mix Wetness in grams of 10% ZnCl₂ solution per 0.4 gram of dry black | Discharge Voltage at 1.42 Watts/Sq. In. | | | | | | | |
|---|---|---|---|---|---|---|---|---|
| | Minutes on Test | | | | | | | Average 1st-5 Min. |
| | 0 | 1 | 2 | 3 | 4 | 5 | 8 | |
| 1.65 g | 1.88 | 1.84 | 1.83 | 1.82 | 1.81 | 1.80 | 1.78 | 1.83 |
| 1.90 g | 1.90 | 1.83 | 1.85 | 1.86 | 1.86 | 1.82 | 1.85 |
| 2.10 g | 1.89 | 1.77 | 1.80 | 1.84 | 1.86 | 1.86 | 1.81 | 1.83 |
| 2.40 g | 1.87 | 1.74 | 1.76 | 1.80 | 1.85 | 1.86 | 1.86 | 1.81 |
| 2.90 g | 1.90 | 1.70 | 1.72 | 1.74 | 1.77 | 1.80 | 1.80 | 1.76 |

However, the greater the amount of water in the cathode, other conditions being the same, the longer will be the life of the cell. The first column of mix wetness relates to the grams of electrolyte for each 0.4 gram of black. The pressure used was 30 lbs. per square inch, but such is not at all critical, it being desirable that the pressure used at the time of moisture impregnation should be at least about that intended for use upon the cell during its actual operation of delivering current.

In order to remove the mold ring, pressure applicator 16 and bibulous material 15 are preferably removed and a stripper plate 17 is substituted, as shown in Fig. 5, plate 17 being of the same size as the mix cake 12'. One purpose of the stripper plate is to hold the wet mix in place and to prevent the material at the edges of the mix from adhering to the inside of the mold ring as the ring is removed. If the stripper plate or equivalent were not used, the edges of the cake might be ragged. If the stripper plate is not used, plunger 16 is allowed to remain in place and the mold ring is raised around the plunger, the pressure on the plunger being relieved so that the wet cake does not extrude horizontally as the ring is raised. The ring 11 and applicator 16 may then be raised far enough above the wet mix cake 12' to be able to remove the ring 11 downwardly from the applicator 16 without touching the wet mix 12'. Stripper plates are preferably used, however, and a sufficient number of the plates and mold rings may be provided so that, as the cathodes are molded, a stripper plate may be laid in place on each cathode and permitted to remain in position until a sufficient number of cathodes have been molded to provide the number of cells required for a battery of a predetermined size. With the stripper plate and mold ring in the position shown in Fig. 5, the cathode is not exposed to air and there is little opportunity for the mix to lose moisture; and when a battery is to be assembled, the cathode which is first molded has substantially the same moisture content as the cathode last molded, and the cells are uniform. The stripper plates may be of any weight up to that which will cause horizontal extrusion of the mix when the mold ring is raised and the plates may conveniently be manipulated by handles (not shown) fastened to the upper surface of the plates by screws. If, however, the wet cathodes are removed from the molding ring and stripper plate said cathodes may be stored without deterioration in a high humidity atmosphere. (80% R. H. or higher.)

During compression and wetting of the black, neither the kraft paper 14 nor the blotting paper 15 need have their edges trimmed to the size of the mix cake, as shown in Fig. 4, but said paper may bend up and tear off as the pressure applicator 16 is moved down into the mold ring 11. Following the compression stroke the pressure applicator 16 and bibulous material 15 are removed and the stripper plate 17 substituted. The mold ring 11 is then lifted off, as shown in Fig. 6, the stripper plate removed, and the kraft paper peeled from the mix cake, as shown in Fig. 7. The mold ring 11 was .08" in thickness and sufficient pressure from the applicator 16 was applied to compress the wet mix to 0.030" in thickness. The original spreading of the dry black and the subsequent application of water and pressure to the mix served to prevent the formation of air pockets between the mix cake and its support. Thus the cellophane separator sheet 10 has the moist mix cake 12 formed on one side of it, while on the other side of it is the immobilized electrolyte layer 19 containing cotton netting to prevent the electrolyte material from spreading laterally under pressure, as mentioned in the prior patent of Cahoon et al., 2,612,538. With the zinc layer 18 and the electrolyte material 19 adjacent to the mix cake 12', the unit thus formed constitutes an assembly unit ready for embodiment in a dry cell of the type disclosed in said aforementioned Cahoon et al. Patent No. 2,612,538.

The particles of carbon for this wet mix cathode portion 12' are preferably of the nature of acetylene black, i. e. they are carbon blacks with chain type structure having a means ultimate particle diameter of from 5 to 10 millimicrons and high gas sorption, and they are relatively soft. Acetylene blacks as well as certain gas blacks have these characteristics.

Among the advantages of this invention may be mentioned the provision of a homogeneous, uniformly moist wet mix containing no air pockets and providing good contact with the contiguous portions of the cell. The amount of moisture contained in the mix is readily controlled by the amount of moisture to be squeezed from the bibulous material 15. The amount of moisture in the cathode may be regulated by the pressure applied to the bibulous material and by its thickness and water absorptive characteristics. For any given pressure, the same amount of water may easily be supplied to all cells by using the same thickness of the same bibulous material for each wetting and having the material saturated with the liquid. Greater or lesser amounts of liquid may be supplied by using thicker or thinner layers of bibulous material or using material having greater or lesser absorbing characteristics, but always using a saturated bibulous layer. Also, greater or lesser amounts of liquid may be supplied by using greater or lesser pressures. The least desired method of supplying liquid is by using bibulous layers which are less than saturated with the liquid as it is difficult to gauge the amount of liquid in the material where it is less than saturated. Where the bibulous material is used in an unsaturated condition it is preferred to obtain this condition in a standardized procedure, for instance, by adding liquid to standard pieces of material until each piece has the same weight or by saturating the pieces and then passing them between rollers or otherwise compressing under a standard pressure or to a standard weight. The kraft paper 14 serves also to spread the liquid over the surface of the black quite uniformly and prevents the liquid from contacting the black in the form of drops, for instance, such partial drops as may hang from the low point of an uneven surface of a saturated bibulous material.

The present invention is an improvement in the production of the batteries and cells disclosed in said prior applications and particularly in the cathodes of such cells. Carbon black has a tendency to ball up or to agglomerate in the form of soft lumps or pellets when mixed with water or electrolyte solution in the usual mixing devices and thus it is difficult to prepare a homogeneous wet cathode mix for application to the anode assembly and to apply it to the anode assembly in a uniform layer free from air pockets; but in the process of the present invention a homogeneous layer of dry or substantially dry black is quite easily prepared in the mold and by wetting and compressing the black in situ a homogeneous wet cathode is easily prepared without danger of air pockets lying next to the anode assembly. Furthermore, by using the present process, the wet cathode mix is exposed to air for a minimum length of time, whereas in the case where a batch of wet mix is made and then used for the preparation of successive cathodes, there is opportunity for the prepared but unused mix to dry materially between the preparation of the first and last cathodes. Moreover, cathodes made according to the present invention can be prepared with more water and yet hold their shape (in case a long life cell is desired) than can cathodes made from previously prepared wet mixes. The phenomenon is believed to be due to the fact that where a mix of black and water is stirred, too much water forms a weak water film on each particle which resists interlocking of the particles and gives a structurally weak mass; but in the case where water is gradually applied and is applied simultaneously with pressure, the particles are gradually interlocked and are supplied with gradually increasing amounts of water up to the point where maximum interlocking and strength are obtained and any extra water distributes over the free surfaces of the particles without materially disturbing the previously formed bonds.

The present invention has made possible the elimination of manufacturing, handling, and storage difficulties heretofore encountered when moisture is added to the mix cake by mechanically mixing the same therein. As shown in the drawings, the mix cake 12 is not of as large area as the cellophane 10, in order that there may be a marginal portion of the cellophane free of mix to thereby reduce the danger of the cell becoming shortcircuited.

In place of the bibulous sheet a substantially non-compressible layer of porous carbon or stone which does not react with electrolyte may be used on top of the kraft paper. A measured quantity of electrolyte solution is added to this wetting head, which is attached to the press member and on compression the electrolyte solution penetrates the black by capillarity. Such porous wetting head may be permanently attached to the pressure member of a molding machine and fed with electrolyte for transfer to the mix during compression but without compressing this porous wetting head.

What is claimed is:

1. The process of forming a dry cell having a thin wet mix cake of carbon black, which black is initially fluffy, which comprises spreading a layer of carbon black within a mold ring contiguous the edges of the black, placing on the layer of carbon black in the mold ring a layer of bibulous material which carries an amount of liquid sufficient to effect a bonding of particles of the carbon black throughout the extent thereof, compressing the carbon black and layer of bibulous material substantially uniformly over the entire area of the layer of carbon black and wetting the carbon black with liquid pressed out of the bibulous material.

2. In a process of forming a thin, dry cell having a wet mix cake of carbon black, the improvement for wetting the carbon black without causing it to ball up, said improvement including spreading a layer of carbon black which is initially fluffy within a mold ring contiguous the edges of the black, placing on the layer of carbon black within the mold ring a distinct layer of porous material, said porous material being wetted with a liquid containing water and a stable wetting agent, and then applying pressure to said carbon black and porous material substantially uniformly to wet the carbon black with liquid from the layer of porous material.

3. The method of forming and wetting a mix cake portion of a thin cathode comprising placing a shallow molding ring on a porous separator, filling dry carbon particles in said ring, levelling off the carbon by running a scraper blade over the top of said molding ring, rejecting the excess carbon material over the edge of said ring, placing a thin kraft paper over the layer of carbon particles in the mold, pressing a wet porous material against the kraft paper, forcing moisture from the wet material and passing the same through the kraft paper into said mix within the molding ring.

4. The process of forming a thin dry cell having a wet mix cake of carbon black, which black is initially fluffy, which comprises spreading a thin layer of carbon black within a mold, placing a distinct layer of wet porous material on the carbon black, compressing the layer of carbon black with said layer of porous material disposed in liquid and pressure transfer relation with at least one surface of the layer of carbon black, said porous layer carrying an amount of liquid sufficient to effect a bonding of particles of the carbon black throughout the extent thereof after they have been compressed, and maintaining the pressure of the porous material on the carbon black until the black is wetted throughout its extent by capillary action from the wet porous material.

5. A process according to claim 4 in which the liquid with which the carbon black is wetted is an electrolyte solution and the amount of the liquid passed into the carbon black is between 1.65 g. and 2.90 g. per .4 g. of dry carbon black.

6. A method of forming a thin compressed wet mix cake of substantially uniform porosity from finely divided carbon black which comprises forming a layer of the carbon black in a mold, placing on said layer of carbon black a distinct layer of a wet porous mass outside the carbon black which porous mass carries an amount of liquid greater in weight than the weight of the layer of carbon black, applying pressure to said layers whereby liquid is expressed from the porous mass and is distributed substantially uniformly from an adjacent surface of the porous material and into the layer of carbon black.

7. A process according to claim 6 in which the particles of said material have a diameter approximately between 5 and 100 millimicrons, the pressure applied is sufficient to compress said layer to less than half its former depth, and the amount of moisture is sufficient to form the cake with about 15% to 20% porosity therein.

8. A process according to claim 6 in which said uniform distribution of moisture is obtained by the application of pressure to a substantially saturated layer of bibulous material.

9. The process of forming a cake of carbon black which comprises substantially simultaneously compressing said carbon black and extruding moisture from a layer of bibulous material between the cake and an object to which the stress for compression is applied, and reducing the danger of carbon black adhering to the bibulous material by an absorbent sheet of material between the cake and bibulous material, said absorbent sheet having a smoother and less adherent surface than does the bibulous material, whereby the danger of the carbon black adhering to the bibulous material is reduced.

HERMAN MEREDITH ZIMMERMAN.

References Cited in the file of this patent
UNITED STATES PATENTS

| Number | Name | Date |
|---|---|---|
| 740,367 | Knight | Sept. 29, 1903 |
| 901,497 | Szek | Oct. 20, 1908 |
| 1,081,277 | Auringer | Dec. 9, 1913 |
| 1,215,700 | Pike | Feb. 13, 1917 |
| 1,733,866 | Crossley | Oct. 29, 1929 |
| 1,899,615 | Heise | Feb. 28, 1933 |
| 2,213,056 | Skoog et al. | Aug. 27, 1940 |
| 2,457,962 | Whaley | Jan. 4, 1949 |